US012587014B2

(12) United States Patent
O'Gorman et al.

(10) Patent No.: US 12,587,014 B2
(45) Date of Patent: Mar. 24, 2026

(54) SYSTEMS AND METHODS FOR ENABLING ENERGY TRANSFER FROM A VEHICLE

(71) Applicant: Ford Global Technologies, LLC, Dearborn, MI (US)

(72) Inventors: Ryan O'Gorman, Beverly Hills, MI (US); Stuart C. Salter, White Lake, MI (US); Peter Phung, Windsor (CA); Brendan Diamond, Grosse Pointe, MI (US)

( * ) Notice: Subject to any disclaimer, the term of this patent is extended or adjusted under 35 U.S.C. 154(b) by 400 days.

(21) Appl. No.: 18/462,216

(22) Filed: Sep. 6, 2023

(65) Prior Publication Data

US 2025/0079835 A1 Mar. 6, 2025

(51) Int. Cl.
*H02J 3/00* (2006.01)
*H02J 7/00* (2006.01)

(52) U.S. Cl.
CPC ............ *H02J 3/003* (2020.01); *H02J 7/0048* (2020.01); *H02J 2310/12* (2020.01)

(58) Field of Classification Search
CPC ...... H02J 3/003; H02J 7/0048; H02J 2310/12; F24F 11/89; F24F 11/64
See application file for complete search history.

(56) References Cited

U.S. PATENT DOCUMENTS 7,734,380 B2 * 6/2010 Ransom ............. H02J 13/0004
380/258
8,872,379 B2 * 10/2014 Ruiz ....................... B60L 1/003
307/66

10,020,656 B2 * 7/2018 Saussele .................. H02J 4/00
12,459,392 B1 * 11/2025 Do Nascimento, Jr. .....................
B60L 53/57
2008/0039989 A1 * 2/2008 Pollack .................. G06Q 50/06
701/22

(Continued)

FOREIGN PATENT DOCUMENTS

WO 2010042550 A2 4/2010

OTHER PUBLICATIONS wallbox.com, Why BiDirectional Charging is the Next Big Thing for EV Owners, pp. 1-7.

(Continued)

*Primary Examiner* — Ziaul Karim
(74) *Attorney, Agent, or Firm* — Emily Campbell; Eversheds Sutherland (US) LLP

(57) ABSTRACT

A vehicle configured to provide energy to a building is disclosed. The vehicle may include a transceiver configured to receive a set point temperature, historical building load consumption information and current building load consumption information associated with the building. The vehicle may further include a processor configured to obtain a trigger signal, and transmit a command signal to cause an activation of a building component to the set point temperature responsive to obtaining the trigger signal. The processor may further compare the current building load consumption information with the historical building load consumption information responsive to activating the building component, and determine a building component load profile based on the comparison and the set point temperature. The processor may then control a building component operation based on the building component load profile.

18 Claims, 4 Drawing Sheets

(56)　　　　　　References Cited

U.S. PATENT DOCUMENTS

| | | | |
|---|---|---|---|
| 2008/0040296 A1* | 2/2008 | Bridges | G01D 4/004 |
| | | | 705/13 |
| 2011/0121779 A1* | 5/2011 | Ichikawa | B60L 50/61 |
| | | | 320/109 |
| 2011/0166710 A1* | 7/2011 | Kordik | H02J 13/00004 |
| | | | 700/277 |
| 2015/0039391 A1* | 2/2015 | Hershkovitz | G01R 31/382 |
| | | | 705/7.31 |
| 2017/0103327 A1* | 4/2017 | Penilla | G06F 3/0482 |
| 2019/0061535 A1* | 2/2019 | Bridges | H02J 3/381 |
| 2023/0182614 A1 | 6/2023 | Mo et al. | |
| 2025/0079835 A1* | 3/2025 | O'Gorman | H02J 7/0048 |

OTHER PUBLICATIONS

Jason Svarc, Vehicle-to-Load Explained—V2L for Backup Power, Clean Energy Review, Apr. 12, 2023, pp. 1-10.

\* cited by examiner

400

402 — Start

404 — Obtain a trigger signal

406 — Transmit a command signal to activate HVAC system

408 — Compare current load consumption with historical load consumption

410 — Determine HVAC load profile based on comparison and set point temperature

412 — Control HVAC system operation based on the HVAC load profile

414 — Stop

SYSTEMS AND METHODS FOR ENABLING ENERGY TRANSFER FROM A VEHICLE

FIELD

The present disclosure relates to systems and methods for enabling energy transfer from a vehicle and more particularly to systems and methods for enabling energy transfer from a vehicle to a building having a heating, ventilation, and air conditioning (HVAC) system.

BACKGROUND

Bi-directional Electrical Vehicles (EVs) are configured to receive as well as supply energy to a charger. The bi-directional energy transfer feature enables the EVs to supply energy to other vehicles, buildings, equipment, etc. For example, an EV may supply energy from an EV battery to a building (e.g., a house), when the building requires excess energy and the power grid may not be able to meet the building's energy requirements. The EV may also supply energy to the building to optimize consumer's spend on energy obtained from the power grid, e.g., during those time durations of the day when charges for the energy drawn from the power grid may be high.

To optimally supply energy to the building without affecting vehicle's performance, it is important to know load profiles of one or more building equipment that may draw considerable energy. For example, it is important to know load profile of a heating, ventilation, and air conditioning (HVAC) system installed in the building to optimize energy transfer to the building, as HVAC systems typically draw considerable energy.

Conventional systems and methods to determine load profiles of HVAC systems use complex external sensors, circuitry, etc. that may not be easily available and may be expensive. Further, determining HVAC load profile using these external sensors, circuitry, etc. is a time-consuming process.

Thus, a system is required to conveniently determine HVAC load profile without requiring complex external equipment.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
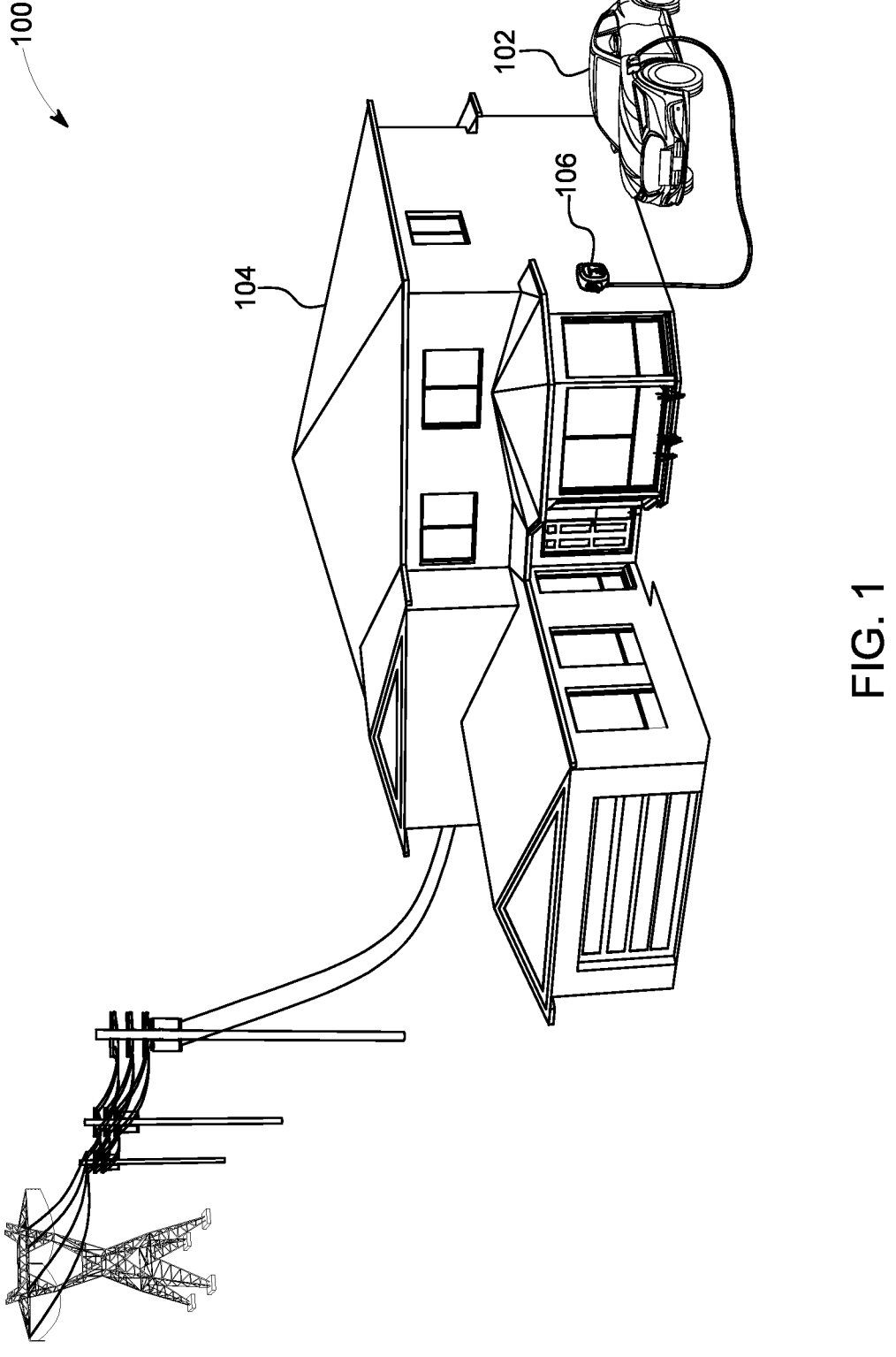
FIG. 1 depicts an example environment in which techniques and structures for providing the systems and methods disclosed herein may be implemented.

The present disclosure describes a bi-directional Electric Vehicle (EV) that may be configured to receive as well as supply energy from/to a building (e.g., a house). The vehicle may be configured to supply energy from a vehicle battery to the house responsive to receiving a request from a user device or a server. In some aspects, the house may include a heating, ventilation, and air conditioning (HVAC) system that may be powered by the energy drawn from a utility power grid and/or the vehicle. In an exemplary aspect, to optimally supply energy to the house and operate the HVAC system, the vehicle may determine and use an HVAC load profile that may be indicative of an expected energy that the HVAC system may consume from the vehicle, for a specific ambient temperature, house temperature and a set point or user desired temperature.

In some aspects, the vehicle may determine the HVAC load profile by obtaining the set point temperature and the house temperature from a thermostat of the house, and ambient temperature from a vehicle ambient temperature sensor or a server. In some aspects, the vehicle may determine the HVAC load profile when an expected fluctuation in load consumed by the house may be within a predefined threshold range. Stated another way, the vehicle may determine the HVAC load profile when load consumption associated with the house may be expected to be steady (e.g., during afternoon time or when no or limited occupants may be present in the house).

Responsive to obtaining the temperatures described above, the vehicle may command the HVAC system to activate/switch ON (or cycle off if the HVAC system may already be in ON state) to the set point temperature via the thermostat. When the HVAC system may be activated, the vehicle may measure the real-time load consumed by the house with the HVAC system in ON state. The vehicle may further obtain historical load consumption information associated with the house at similar temperature conditions from the server. The vehicle may then compare the real-time load consumption and the historical load consumption to "isolate" the load consumed by the HVAC system, thereby determining the HVAC load profile at the obtained temperatures. The vehicle may further store the determined HVAC load profile in a vehicle memory for future usage.

When the vehicle receives a request in the future to supply energy to the house at similar temperature conditions, the vehicle may use the stored HVAC load profile to control the supply of energy to the house and/or the HVAC system operation. In an exemplary aspect, responsive to receiving the request, the vehicle may use the HVAC load profile to predict an expected energy that may be required to be supplied to the house to operate the HVAC system to the set point temperature. The vehicle may then compare the expected energy with a level/amount of energy stored in the vehicle battery. When the amount of energy stored in the vehicle battery may be less than the expected energy, the vehicle may request the home/vehicle owner to change the set point temperature so that lesser amount of energy may be required to operate the HVAC system, or switch OFF the HVAC system (e.g., when the amount of energy stored in the vehicle battery may be low).

The present disclosure discloses a vehicle that may determine and use the HVAC load profile to optimally supply energy to the house. The vehicle determines the HVAC load profile without requiring any external or complex sensors, circuitry, etc. Further, since the vehicle uses the HVAC load profile to optimally supply energy to the house, energy stored in the vehicle battery is optimally used without affecting vehicle performance.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a building 104 (or a house 104). The vehicle 102 may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially or fully autonomous mode. In some aspects, the vehicle 102 may be a bi-direction Electric Vehicle (EV) that may be configured to receive and supply energy from/to other vehicles, chargers, buildings, equipment, and/or the like. In an exemplary aspect, the vehicle 102 may be configured to supply energy to the house 104 via a charger point 106, which may be installed in the house 104 (as shown in FIG. 1) or anywhere in proximity to the house 104.

The house 104 may include one or more house equipment that may be powered by energy drawing from utility power grid and/or the vehicle 102. Examples of house equipment include, but are not limited to, a heating, ventilation, and air conditioning (HVAC) system (shown as HVAC 209 in FIG. 2), fans, lights, electronic equipment, and/or the like. In some aspects, the vehicle 102 may supply energy to the house 104 to power the house equipment when the energy requirements of the house 104 may be greater than the energy that the power grid may provide, or when charges for energy drawn from the power grid may be high, or when a house/vehicle owner requests (via a user device) the vehicle 102 to supply energy to the house 104. For example, a vehicle or house owner may request the vehicle 102 to supply energy to the house 104 during morning time when the charges for energy used from the power grid may be high, and may enable the house equipment to operate via the energy drawn from the power grid during afternoons when the corresponding charges may be low.

The scenarios described above for supplying energy from the vehicle 102 to the house 104 are exemplary in nature and for illustrative purpose only. The described scenarios should not be construed as limiting. The vehicle or house owner may request the vehicle 102 to supply energy to the house 104 at any time, based on user requirements and/or energy supply or requirement conditions.

In some aspects, the house 104 may include a thermostat (shown as thermostat 208 in FIG. 2) that may be configured to control HVAC system operation, measure a real-time house interior portion temperature (or house temperature), and enable a user to control the house temperature. For example, the user may input a set point temperature associated with the house 104 on the thermostat. The set point temperature may be, for example, a temperature desired by the user for the house 104 or a lowest (or highest) house temperature that the user may accept when the power grid may be experiencing high demand. The thermostat may be configured to activate and/or deactivate the HVAC system based on the house temperature and the set point temperature. For example, the thermostat may switch ON the Air Conditioner (AC) when the house temperature may be higher than the set point temperature, and may switch OFF the AC when the house temperature may be lower than or equivalent to the set point temperature.

The vehicle 102 may be communicatively coupled with the thermostat and may be configured to obtain the house temperature and the set point temperature from the thermostat. The vehicle 102 may be further configured to control HVAC system operation via the thermostat. For example, the vehicle 102 may transmit command signals to the thermostat to switch ON or OFF the HVAC system to optimize the supply of energy from the vehicle 102, when the vehicle 102 may be supplying energy to the house 104.

The vehicle 102 may be further configured to determine a load profile of the HVAC system (or HVAC load profile) to optimize energy transfer from the vehicle 102 to the house 104 and/or to optimize HVAC system operation. In some aspects, the HVAC load profile may be indicative of an expected load or energy that the HVAC system may draw from the vehicle 102 at a specific set point temperature, a specific ambient temperature and a specific house temperature. For example, the HVAC load profile may indicate an expected energy (e.g., a first energy amount) that the HVAC system may draw from the vehicle 102 to cool a house temperature of 80 degrees Fahrenheit to a set point temperature of 75 degrees Fahrenheit, when the ambient temperature may be 85 degrees Fahrenheit. As another example, the HVAC load profile may indicate an expected energy (e.g., a second energy amount) that the HVAC system may draw from the vehicle 102 to cool a house temperature of 85 degrees Fahrenheit to a set point temperature of 75 degrees Fahrenheit, when the ambient temperature may be 90 degrees Fahrenheit.

A person ordinarily skilled in the art may appreciate that the first energy amount described above may be different from the second energy amount, as the HVAC system may require more energy to cool the house 104 when the ambient temperature and/or the house temperature may be high. In some aspects, the HVAC load profile may also depend on the house 104, e.g., a type of insulation in the house 104, a house location (e.g., height above sea-level), typical humidity level in a geographical area where the house 104 may be located, and/or the like.

As described above, determining the HVAC load profile may enable the vehicle 102 to optimize HVAC operation and/or control the supply of energy to the house 104. For example, if the vehicle 102 determines from the HVAC load profile that the HVAC system may require the second energy amount described above (which may be higher than the first energy amount) to operate, and the vehicle 102 may not have enough charge or energy available in a vehicle battery to supply the second energy amount, the vehicle 102 may transmit a command signal to the thermostat to switch OFF the HVAC system. In this case, by switching OFF the HVAC system, the vehicle 102 may at least provide energy to other house equipment (e.g., fans, lights, etc.) that may draw lesser energy. As another example, when the vehicle 102 may not have enough energy available in the vehicle battery to supply the second energy amount, the vehicle 102 may transmit a notification to a user device requesting the user to increase the set point temperature, thereby ensuring that less energy (e.g., less than the second energy amount) may be required to operate the HVAC system to the "increased" set point.

In some aspects, the vehicle 102 may use historical load information associated with the house 104 at different ambient temperatures, house temperatures and set point temperatures, along with real-time or "current" house temperature, ambient temperature and set point temperature to determine the HVAC load profile. In an exemplary aspect, the vehicle 102 may determine the HVAC load profile when load fluctuations in the house 104 may be expected to be low (e.g., during night time or during afternoons when no or limited house occupants may be present in the house 104), so that the vehicle 102 may accurately determine the HVAC load profile (without interference from other equipment that may draw considerable energy). Responsive to determining the HVAC load profile at a specific set point temperature, house temperature and ambient temperature, the vehicle 102 may store the determined HVAC load profile in a vehicle memory and/or a server. In the future, when the user requests the vehicle 102 to supply energy to the house 104 at similar temperature conditions (e.g., similar house, set point and ambient temperatures), the vehicle 102 may fetch the HVAC load profile from the vehicle memory and/or the server, and may control the supply of energy to the house 104 and/or the HVAC system operation based on the HVAC load profile, as described above.

The details of the process to determine the HVAC load profile are described below in conjunction with FIG. 2.

The vehicle 102 implements and/or performs operations, as described here in the present disclosure, in accordance with the owner manual and safety guidelines. In addition, any action taken by the user based on recommendations or notifications provided by the vehicle 102 should comply with all the rules specific to the location and operation of the vehicle 102 (e.g., Federal, state, country, city, etc.). The recommendation or notifications, as provided by the vehicle 102, should be treated as suggestions and only followed according to any rules specific to the location and operation of the vehicle 102.

Figure 2:
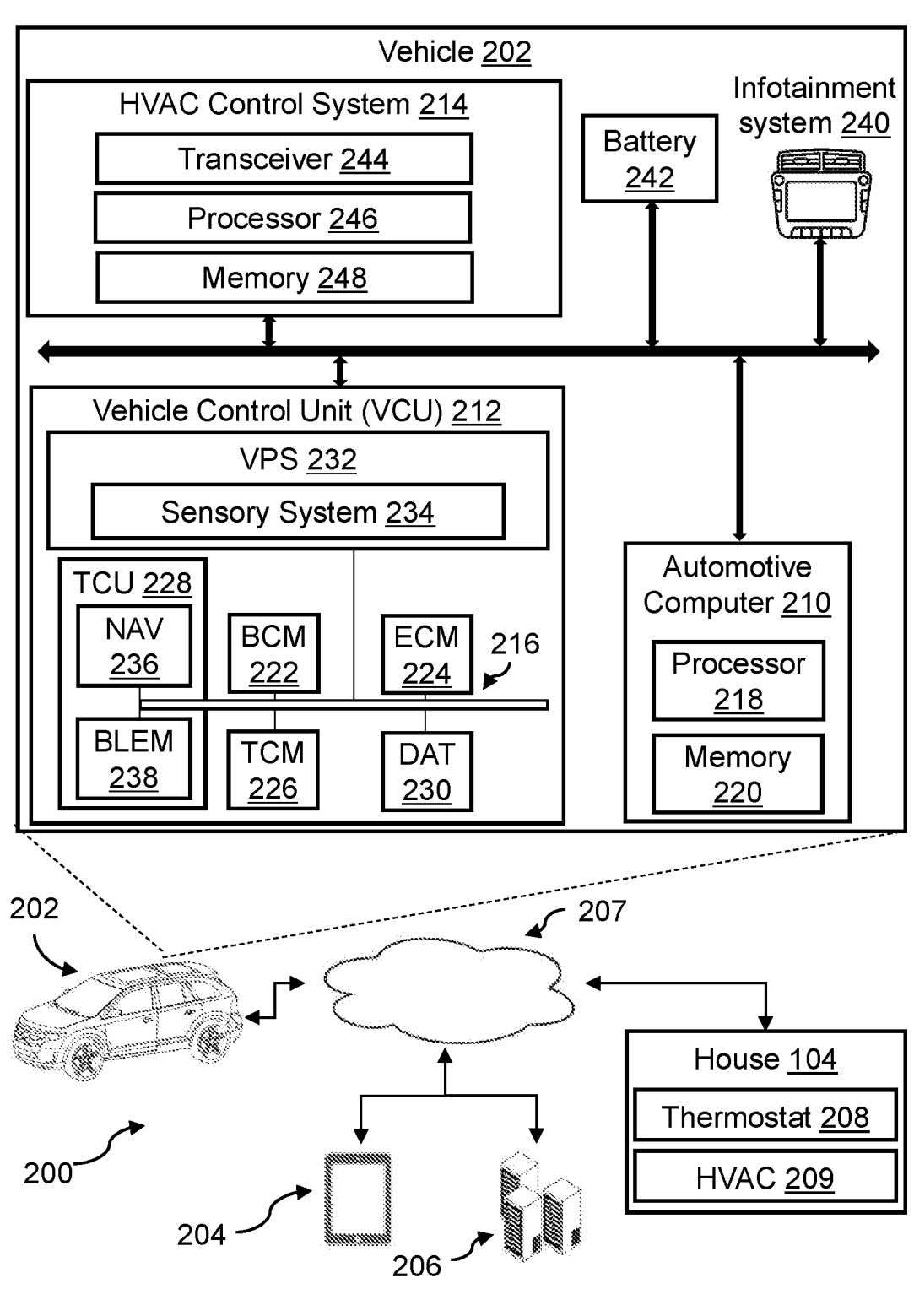
FIG. 2 depicts a block diagram of an example system to supply energy from a vehicle to a building in accordance with the present disclosure.

FIG. 2 depicts a block diagram of an example system 200 to supply energy from a vehicle 202 to the house 104 in accordance with the present disclosure. The vehicle 202 may be same as the vehicle 102 described above.

The system 200 may include the vehicle 202, a user device 204 and one or more servers 206 communicatively coupled with each other via one or more networks 207. In some aspects, the vehicle 202 may further be communicatively coupled with a thermostat 208 of the house 104. The vehicle 202 may control operation of an HVAC system 209 (or HVAC 209) of the house 104 via the thermostat 208, as described above.

The user device 204 may be associated with a vehicle owner or a house owner (who may be same or different). The user device 204 may include, but is not limited to, a mobile phone, a laptop, a computer, a tablet, a wearable device, or any other similar device with communication capabilities. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In further aspects, the server(s) 206 may be associated with a firm that supplies energy to the house 104 via a power grid. In this case, the server(s) 206 may be communicatively coupled with the thermostat 208 and may obtain information associated with the house temperature, the set point temperature, and/or the like from the thermostat at a predefined frequency. The server(s) 206 may be further configured to store historical load consumption information associated with the house 104 (or historical house load consumption information) and transmit the information to the vehicle 102, via the network(s) 207. The historical load consumption information may include information associated with the load or energy historically consumed by the house 104 (e.g., over a predefined time duration, e.g., 3 months, 6 months, 12 months, 24 months, and/or the like) at different house temperatures, set point temperatures, ambient temperatures, humidity levels, weather conditions, etc. The server(s) 206 may further be communicatively coupled with a current transformer meter associated with the house 104, which may enable the server(s) 206 to obtain a real-time or current load consumption information associated with the house 104 (or current load consumption information). The server(s) may transmit the real-time or current load consumption information to the vehicle 202, when the vehicle 202 may be connected to the house 104 (e.g., via the charger point 106) and/or at a predefined frequency. In additional aspects, the server(s) 206 may be associated with a firm that provides weather related information to the vehicle 102 and other vehicles operating as part of a fleet. In this case, the server(s) 206 may transmit real-time ambient temperature of a geographical area where the house 104 or the vehicle 202 may be located, to the vehicle 202 via the network(s) 207.

The network(s) 207 illustrates an example communication infrastructure in which the connected devices discussed in various embodiments of this disclosure may communicate. The network(s) 207 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The thermostat 208 may be configured to receive user's inputs associated with the set point temperature (described above in conjunction with FIG. 1) and transmit the set point temperature to the vehicle 202. The thermostat 208 may also be configured to measure the house temperature and transmit the house temperature to the vehicle 202, as described above. The thermostat 208 may be further configured to control HVAC operation (e.g., switch OFF or ON the HVAC 209) based on command signals received from the vehicle 202.

The vehicle 202 may include a plurality of units including, but not limited to, an automotive computer 210, a Vehicle Control Unit (VCU) 212, and an HVAC control system 214 (or system 214). The VCU 212 may include a plurality of Electronic Control Units (ECUs) 216 disposed in communication with the automotive computer 210.

The user device 204 may connect with the automotive computer 210 and/or the system 214 via the network 207, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the system 214 may be installed in a vehicle engine compartment (or elsewhere in the vehicle 202), in accordance with the disclosure. Further, the automotive computer 210 may operate as a functional part of the system 214. The automotive computer 210 may be or include an electronic vehicle controller, having one or more processor(s) 218 and a memory 220. Moreover, the system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable storage medium or memory storing an HVAC control program code. The memory 220 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 may include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, one or more ambient weather or temperature sensors, vehicle interior and exterior cameras, steering wheel sensors, inertial measurement unit (IMU), etc. The ambient temperature sensor may be configured to measure/determine ambient (environment) temperature in proximity to the vehicle 202.

In some aspects, the VCU 212 may control vehicle operational aspects and implement one or more instruction sets received from the user device 204, from one or more instruction sets stored in the memory 220, including instructions operational as part of the system 214.

The TCU 228 may be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from the automotive computer 210, the system 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that may include, for example, active parking assistance, vehicle backup assistance, and adaptive cruise control, among other features. The DAT controller 230 may also provide aspects of user and environmental inputs usable for user authentication.

In some aspects, the automotive computer 210 may connect with an infotainment system 240. The infotainment system 240 may include a touchscreen interface portion, and may include voice recognition features, biometric identification capabilities that may identify users based on facial recognition, voice recognition, fingerprint identification, or other biological identification means. In other aspects, the infotainment system 240 may be further configured to receive user instructions via the touchscreen interface portion, and/or output or display notifications, navigation maps, etc. on the touchscreen interface portion.

The vehicle 202 may further include a battery 242 that may be configured to store energy. In some aspects, the vehicle 202 may supply the energy to the house 104 by using the energy stored in the battery 242.

The computing system architecture of the automotive computer 210, the VCU 212, and/or the system 214 may omit certain computing modules. It should be readily understood that the computing environment depicted in FIG. 2 is an example of a possible implementation according to the present disclosure, and thus, it should not be considered as limiting or exclusive.

In accordance with some aspects, the system 214 may be integrated with and/or executed as part of the ECUs 216. The system 214, regardless of whether it is integrated with the automotive computer 210 or the ECUs 216, or whether it operates as an independent computing system in the vehicle 202, may include a transceiver 244, a processor 246, and a computer-readable memory 248.

The transceiver 244 may be configured to receive information/inputs from one or more external devices or systems, e.g., the user device 204, the server(s) 206, the thermostat 208, and/or the like, via the network 207. For example, the transceiver 244 may be configured to receive a user request from the user via the user device 204 to supply energy from the vehicle 202 to the house 104. The transceiver 244 may be further configured to receive the historical load consumption information, the real-time or current load consumption information, real-time ambient temperature, humidity level information, etc. from the server(s) 206. The transceiver 244 may be additionally configured to receive the set point temperature and the real-time house temperature from the thermostat 208. Further, the transceiver 244 may transmit notifications or signals to the external devices or systems. In addition, the transceiver 244 may be configured to receive information/inputs from vehicle components such as the infotainment system 240, the vehicle sensory system 234 (e.g., ambient temperature from the ambient temperature sensor), and/or the like. Further, the transceiver 244 may transmit signals (e.g., command signals) or notifications to the vehicle components such as the infotainment system 240.

The processor 246 and the memory 248 may be same as or similar to the processor 218 and the memory 220, respectively. In some aspects, the processor 246 may utilize the memory 248 to store programs in code and/or to store data for performing aspects in accordance with the disclosure. The memory 248 may be a non-transitory computer-readable storage medium or memory storing the HVAC control program code. In some aspects, the memory 248 may additionally store instructions/information/data obtained from the server(s) 206, the user device 204, and the thermostat 208.

In operation, the processor 246 may obtain a trigger signal to begin a process of determining the HVAC load profile, via the transceiver 244. In some aspects, the processor 246 may obtain the trigger signal when the vehicle 102 may be supplying energy to the house 104 (e.g., via the charger point 106) and an expected fluctuation in the house load consumption over a predefined time duration may be within a predefined range (e.g., within 1-5% range of average load consumption). Stated another way, the processor 246 may obtain the trigger signal when load fluctuations in the house 104 may be expected to be low (e.g., during night time or during afternoons when no or limited house occupants may be present in the house 104). In some aspects, the processor 246 may obtain the trigger signal from the server(s) 206 that may identify an optimum time duration to determine the HVAC load profile based on analysis of the historical load consumption information. For example, based on the historical load consumption information, the server(s) 206 may identify a typical time duration of the day at which the fluctuations in the house load are generally less (e.g., less than a predefined threshold). Responsive to identifying the time duration, the server(s) may transmit, via the network 207, the trigger signal to the processor 246 at the start of the identified time duration.

In other aspects, the processor 246 may itself identify the optimum time duration based on the historical load consumption information that may be stored in the memory 248 (that may store the historical load consumption information received from the server(s) 206). In this case, the processor 246 may obtain the trigger signal from a vehicle timer (not shown), which may transmit the trigger signal to the processor 246 at the start of the identified time duration.

In yet another aspect, the processor 246 may obtain the trigger signal to begin the process of determining the HVAC load profile from the user device 204. In this case, the user may transmit the trigger signal to the processor 246 via the user device 204.

Responsive to obtaining the trigger signal, the processor 246 may obtain the historical load consumption information, the real-time or current load consumption information, real-time ambient temperature, humidity level information, etc. from the server(s), via the transceiver 244. The processor 246 may further obtain the set point temperature and the real-time house temperature from the thermostat 208, via the transceiver 244. The processor 246 may additionally obtain the real-time ambient temperature from the vehicle sensory system 234 (in addition to or alternative to obtaining the real-time ambient temperature from the server(s) 206). In further aspects, the vehicle 102 may be communicatively connected with the current transformer meter associated with the house 104, and the processor 246 may obtain the real-time or current load consumption information from the current transformer meter, via the transceiver 244. In yet another aspect, the processor 246 may obtain the real-time or current load consumption information from the charger point 106, when the vehicle 202 may be supplying energy to the house 104 via the charger point 106.

Furthermore, responsive to obtaining the trigger signal, the processor 246 may transmit, via the transceiver 244, a command signal to the thermostat 208 to activate or switch ON the HVAC 209 to the set point temperature. If the HVAC 209 may already be in an activated state (i.e., already switched ON), the processor 246 may cause the HVAC 209 to cycle off or may switch OFF and ON the HVAC 209 one or more times.

Responsive to activating the HVAC 209, the processor 246 may measure/monitor the real-time load consumption information of the house 104 or the real-time amount of energy that may be transferred from the vehicle 202 to the house 104 for the time duration till the house temperature reaches to the set point temperature. Furthermore, responsive to activating the HVAC 209, the processor 246 may identify that historical load consumption information (from the historical load consumption information stored in the memory 248 or obtained from the server(s) 206) which may be associated with similar ambient and house load conditions. For example, if the processor 246 determines that the ambient temperature is 90 degrees Fahrenheit, the house temperature is 85 degrees Fahrenheit, the set point temperature is 80 degrees Fahrenheit, and it is afternoon time (when no one is expected to be at the house 104), the processor 246 may identify that historical load consumption information which may be associated with similar temperature and house conditions.

The processor 246 may further compare the real-time load consumption information with the identified historical load consumption information to "isolate" or determine an HVAC load profile. Stated another way, the processor 246 may compare the real-time load consumption information with the identified historical load consumption information to determine an amount of load/energy that may be required to operate the HVAC 209. In some aspects, the processor 246 may make the comparison described above by subtracting the identified historical load consumption information from the real-time load consumption information. A person ordinarily skilled in the art may appreciate that by subtracting the identified historical load consumption information from the real-time load consumption information, the processor 246 may determine the amount of energy/load that is specifically required to operate the HVAC 209.

In some aspects, the determined amount of energy/load described above may be indicative of an "HVAC load profile" associated with the HVAC 209 at the specific ambient temperature, the house temperature and the set-point temperature. Stated another way, the processor 246 determines the HVAC load profile based on the comparison between the real-time load consumption information and the identified historical load consumption information, and the specific ambient temperature, the house temperature and the set-point temperature.

A person ordinarily skilled in the art may appreciate that the HVAC load profile may be different for different ambient, set point and/or house temperatures (and also humidity levels, house types, etc.). For example, the vehicle 202 may be required to supply more energy to heat the house 104 to a specific set point temperature when the ambient temperature may be very low (e.g., in a range of 20-25 degrees Fahrenheit), as compared to the energy required to heat the house 104 to the same set point temperature when the ambient temperature may be relatively higher (e.g., in a range of 45-55 degrees Fahrenheit).

Responsive to determining the HVAC load profile at the specific ambient temperature, the house temperature and the set-point temperature, the processor 246 may store the HVAC load profile in the memory 248. The processor 246 may then use the stored HVAC load profile in the future, when the user requests the vehicle 202 to supply energy to the house 104 at similar temperature conditions. Specifically, by using the stored HVAC load profile, the processor 246 may control HVAC system operation and/or the supply of energy to the house 104. An example process of controlling the HVAC system operation and/or the supply of energy to the house 104 is depicted in FIG. 3 and described below.

Figure 3:
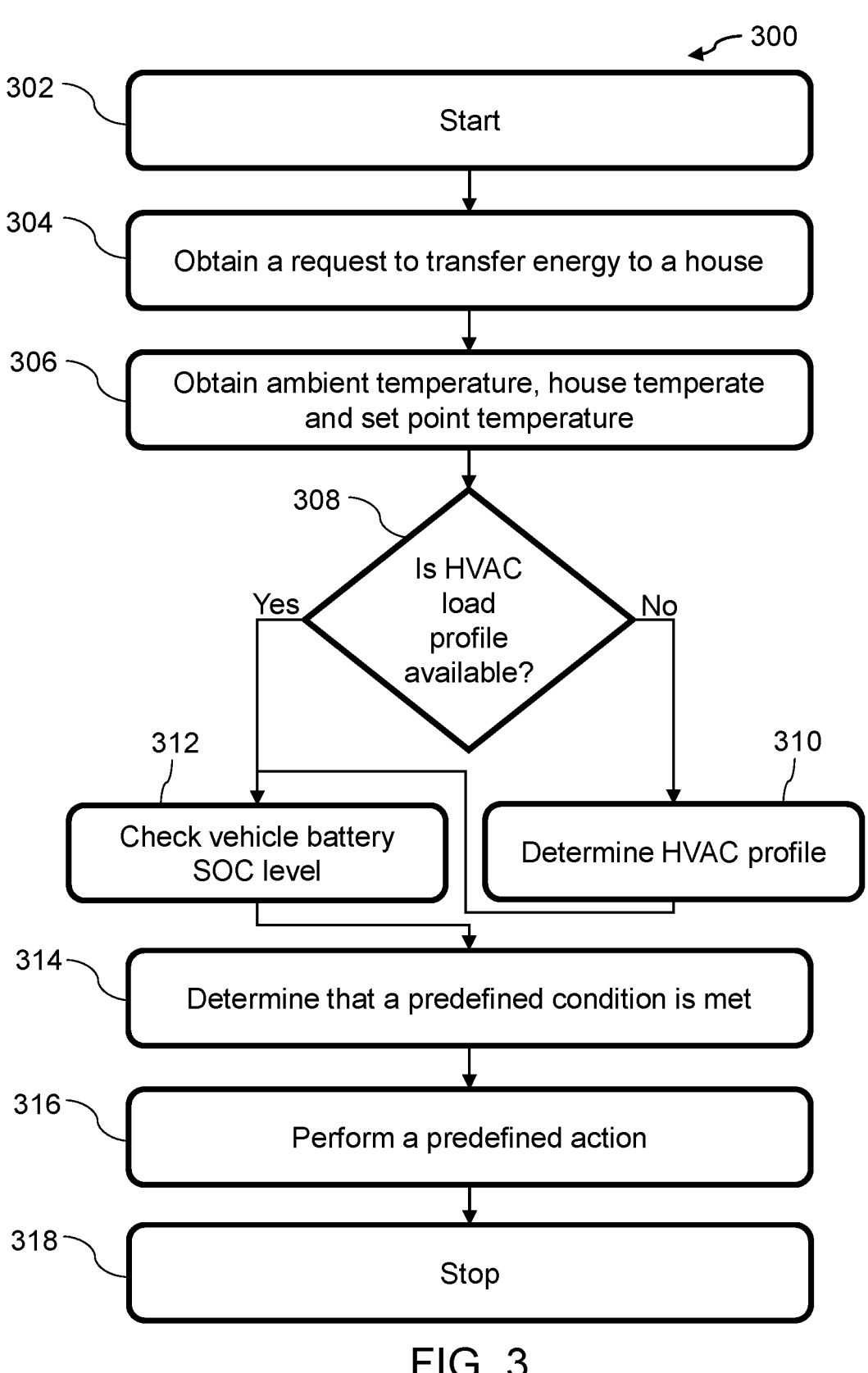
FIG. 3 depicts a flow diagram of an example first method to supply energy from a vehicle to a building in accordance with the present disclosure.

FIG. 3 depicts a flow diagram of an example first method 300 to supply energy from the vehicle 202 to the house 104 in accordance with the present disclosure. FIG. 3 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 300 starts at step 302. At step 304, the method 300 may include obtaining, by the processor 246, a request from the user or the server(s) 206 to supply energy from the vehicle 202 to the house 104. The user may transmit the request to the processor 246 via the user device 204 or the infotainment system 240. At step 306, the method 300 may include obtaining, by the processor 246, the real-time ambient temperature, the house temperature and the set-point temperature, responsive to obtaining the request. As described above, the processor 246 may obtain respective temperatures from the thermostat 208, the server(s) 206 and/or the ambient temperature sensor. In other aspects, the request obtained from the server(s) 206 and the infotainment system 240 may additionally include the temperatures described above.

At step 308, the method 300 may include determining, by the processor 246, whether an HVAC load profile is already available/stored in the memory 248 associated with or corresponding to the obtained ambient temperature, the house temperature and the set-point temperature. Specifically, at the step 308, the processor 246 may determine whether the processor 246 may have already determined the HVAC load profile at the same temperature conditions before.

Responsive to determining at the step 308 that the HVAC load profile may not be available, the processor 246 may determine the HVAC load profile in the similar manner as described above in conjunction with FIG. 2, at step 310.

On the other hand, responsive to determining at the step 308 that the HVAC load profile may be available/stored in the memory 248, the processor 246 may predict or estimate an expected amount of energy that may be required to be supplied to the house 104 and operate the HVAC 209 optimally, based on the HVAC load profile and the obtained temperatures. Further, the processor 246 may check a current state of charge (SOC) level of the battery 242, at step

312. The processor 246 may then compare the SOC level with the estimated expected amount of energy.

At step 314, the method 300 may include determining, by the processor 246, that a predefined condition may be met based on the comparison. In some aspects, the processor 246 may determine that the predefined condition may be met when the estimated expected amount of energy may be more than the SOC level. At step 316, the method 300 may include performing, by the processor 246, a predefined action responsive to determining that the predefined condition may be met. Examples of the predefined action are described below. In some aspects, responsive to determining that the predefined condition may not be met, the processor 246 may cause the vehicle 202 to supply energy to the house 104 by using the energy stored in the battery 242.

In a first exemplary aspect, the predefined action may include transmitting a deactivation command signal to the thermostat 208 to deactivate or switch OFF the HVAC 209. Responsive to deactivating the HVAC 209, the vehicle 102 may supply energy to the house 104 (to power other house equipment). In a second exemplary aspect, the predefined action may include transmitting a recommendation to the user device 204 or the infotainment system 240, requesting the user to change the set point temperature. For example, the processor 246 may request the user to reduce (or increase) the set point temperature, so that the vehicle 202 may be required to supply lesser amount of energy to the house 104. Responsive to the user changing the set point temperature, the processor 246 may cause the vehicle 202 to supply energy to the house 104.

In some aspects, the vehicle 202 may supply energy to the house 104 by slowly ramping up the energy supplied to the house 104, thereby causing the energy supplied by the power grid to the house 104 to slowly ramp down. Further, although the description above describes an aspect where the vehicle 202 monitors load consumption of the entire house 104 to determine the HVAC load profile and supplies energy to the entire house 104, in some aspects, the vehicle 202/ processor 246 may monitor load consumption associated with parts or portions of the house 104 (e.g., the house portion that the vehicle owner may own) and supply energy to the parts or portions of the house 104, as opposed to the entire house 104. In this case, the vehicle owner may provide user inputs to the processor 246 indicating the specific house parts/portions owned by the vehicle owner. In further aspects, the vehicle 202/processor 246 may be configured to "offset" or control energy distribution/transfer from the vehicle 202 or consumption to one or more specific parts (or one or more equipment) of the house 104 to balance energy consumption in a house occupied or owned by multiple households (based on house's historical energy consumption pattern). For example, if a user "A" uses more energy but the electricity bill may be split between four house users, the processor 246 may transfer power to the house 104 to balance the difference of energy consumption between the four house users, based on house's historical energy consumption pattern.

The method 300 may end at step 318.

Figure 4:
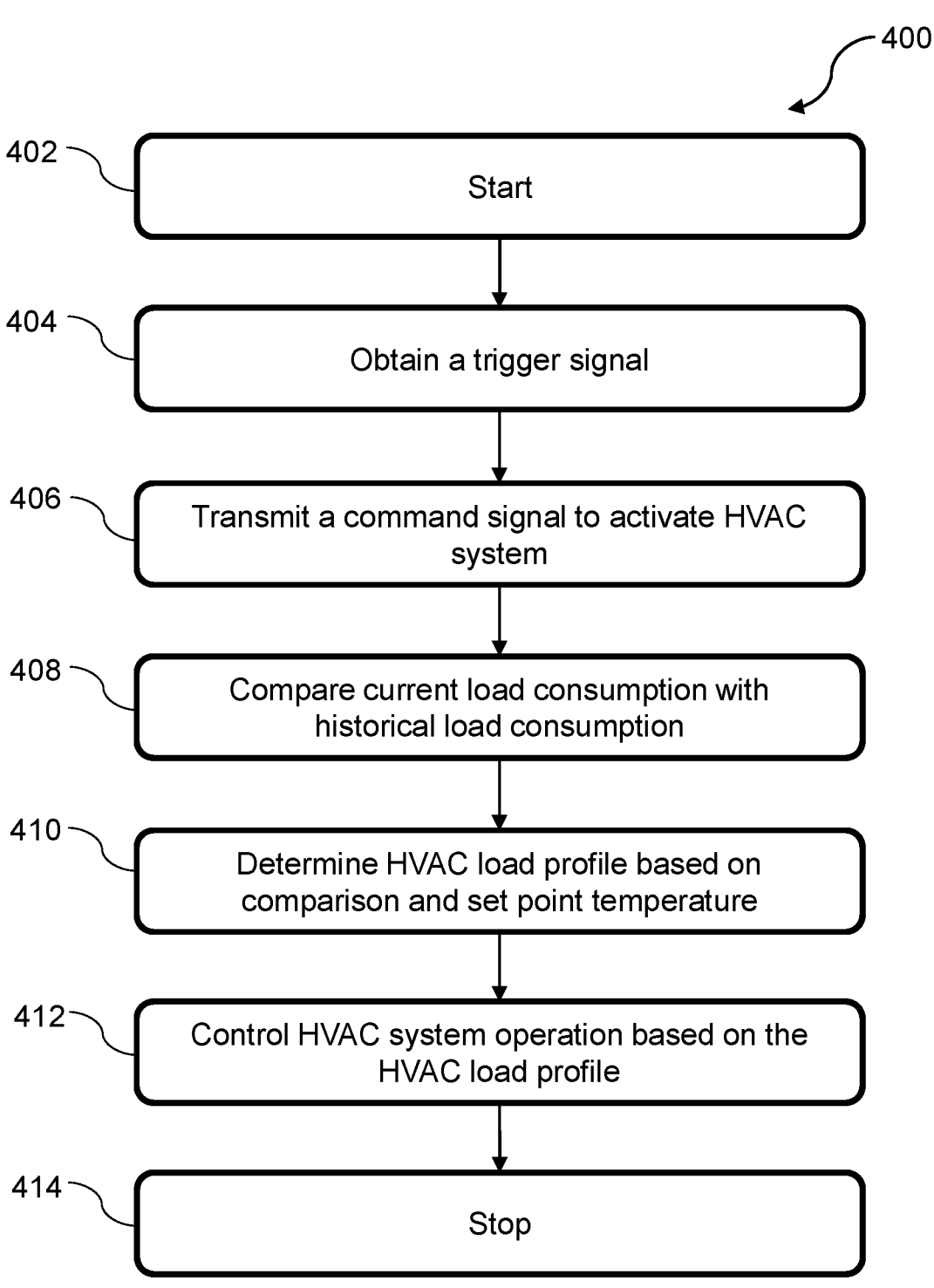
FIG. 4 depicts a flow diagram of an example second method to supply energy from a vehicle to a building in accordance with the present disclosure.

FIG. 4 depicts a flow diagram of an example second method 400 to supply energy from the vehicle 202 to the house 104 in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include obtaining, by the processor 246, the trigger signal to begin the process of determining the HVAC load profile. At step 406, the method 400 may include transmitting, by the processor 246, the command signal to the thermostat 208 to activate the HVAC 209 to the set point temperature. At step 408, the method 400 may include comparing, by the processor 246, the real-time or current load consumption information with the historical load consumption information. At step 410, the method 400 may include determining, by the processor 246, the HVAC load profile based on the comparison and the set point temperature (and the ambient and house temperatures, as described above). At step 412, the method 400 may include controlling, by the processor 246, the HVAC system operation based on the HVAC load profile, as described above.

At step 414, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle configured to provide energy to a building, the vehicle comprising:

a transceiver configured to receive a set point temperature, historical building load consumption information and current building load consumption information associated with the building; and a processor communicatively coupled with the transceiver, wherein the processor is configured to:

obtain a trigger signal;

transmit a command signal to cause an activation of a first building component to the set point temperature responsive to obtaining the trigger signal;

compare the current building load consumption information with the historical building load consumption information responsive to activating the first building component;

determine the first building component load profile based on the comparison and the set point temperature; and control the first building component operation based on the first building component load profile, wherein the first building component is a heating, ventilation, and air conditioning (HVAC) system of the building.

2. The vehicle of claim 1, wherein the transceiver is further configured to receive an ambient temperature and a building temperature.

3. The vehicle of claim 2, wherein the processor is further configured to determine the first building component load profile based on the ambient temperature and the building temperature.

4. The vehicle of claim 2, wherein the transceiver receives the set point temperature and the building temperature from a second building component, and wherein the transceiver receives the ambient temperature from an ambient temperature sensor or a server.

5. The vehicle of claim 4, wherein the processor transmits the command signal to the second building component.

6. The vehicle of claim 4, wherein the second building component is a building thermostat.

7. The vehicle of claim 1, wherein the transceiver receives the historical building load consumption information and the current building load consumption information from a server or a third building component.

8. The vehicle of claim 1, wherein the processor obtains the trigger signal from a server, a user device or a vehicle timer.

9. The vehicle of claim 1, wherein the processor obtains the trigger signal when an expected fluctuation in building load consumption over a predefined time duration is within a predefined range.

10. The vehicle of claim 1 further comprising a vehicle memory configured to store the first building component load profile.

11. The vehicle of claim 1 further comprising a battery configured to store energy to be provided to the building, wherein the processor is further configured to:

determine a battery state of charge (SOC) level; and
   control the first building component operation based on the battery SOC level and the first building component load profile.

12. The vehicle of claim 1, wherein the processor is further configured to:

obtain a request to provide energy to the building, wherein the request comprises a user desired building temperature, a current ambient temperature and a current building temperature;
   estimate an amount of energy to be supplied to the building based on the request and the first building component load profile; and
   perform a predefined action based on the amount of energy.

13. The vehicle of claim 12, wherein the predefined action comprises at least one of:

transmitting a recommendation to a user device to change the user desired building temperature; and
   transmitting a deactivation command signal to cause deactivation of the first building component.

14. The vehicle of claim 1, wherein the processor is further configured to control energy transfer from the vehicle to one or more building equipment or one or more parts of the building based on at least one of a historical energy consumption pattern and user inputs.

15. A method to provide energy from a vehicle to a building, the method comprising:

receiving, by a transceiver, a set point temperature, a historical building load consumption information and a current building load consumption information associated with the building;
   obtaining, by a processor, a trigger signal;
   transmitting, by the processor, a command signal to cause an activation of a first building component to the set point temperature responsive to obtaining the trigger signal;
   comparing, by the processor, the current building load consumption information with the historical building load consumption information responsive to activating the first building component;
   determining, by the processor, the first building component load profile based on the comparison and the set point temperature; and
   controlling, by the processor, the first building component operation based on the first building component load profile,
   wherein the first building component is a heating, ventilation, and air conditioning (HVAC) system of the building.

16. The method of claim 15 further comprising determining the first building component load profile based on an ambient temperature and a building temperature.

17. The method of claim 15, wherein transmitting the command signal comprises transmitting the command signal to a building thermostat.

18. A non-transitory computer-readable storage medium having instructions stored thereupon which, when executed by a processor cause the processor to:

obtain a trigger signal;
   cause energy transfer from a vehicle a building responsive to the trigger signal;
   obtain via the transceiver, a set point temperature, a historical building load consumption information and a current building load consumption information associated with the building; obtain a trigger signal;
   transmit a command signal to cause an activation of a first building component to a set point temperature responsive to obtaining the trigger signal;
   compare current building load consumption information with historical building load consumption information responsive to activating the first building component;
   determine the first building component load profile based on the comparison and the set point temperature; and
   control the first building component operation based on the first building component load profile,
   wherein the first building component is a heating, ventilation, and air conditioning (HVAC) system of the building.

* * * * *